Patented Mar. 29, 1938

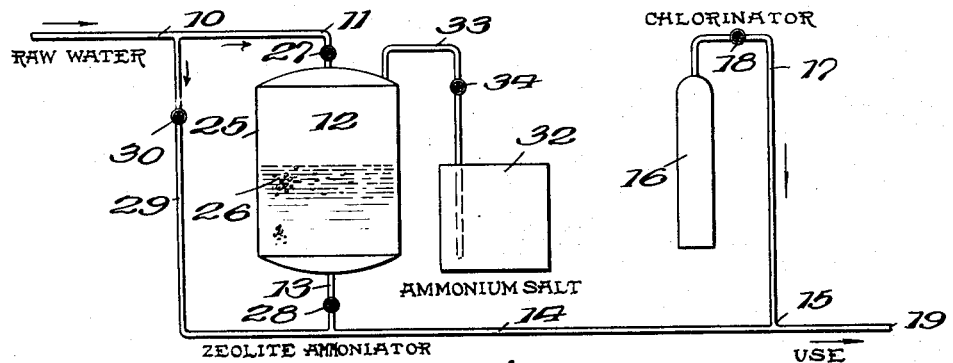
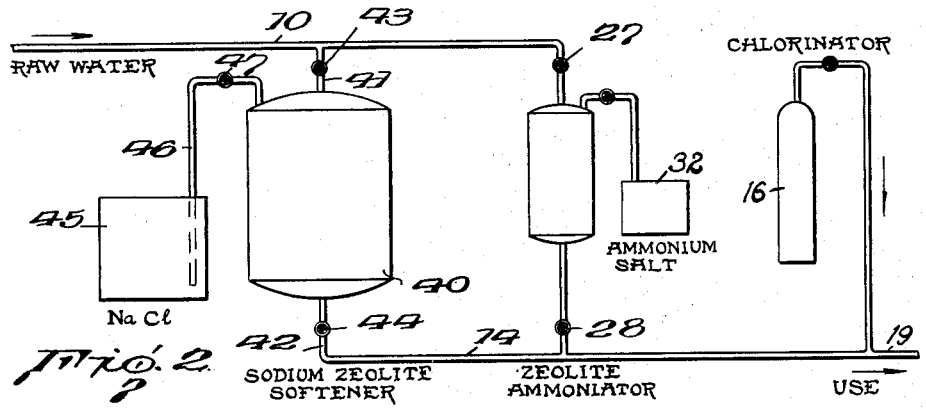
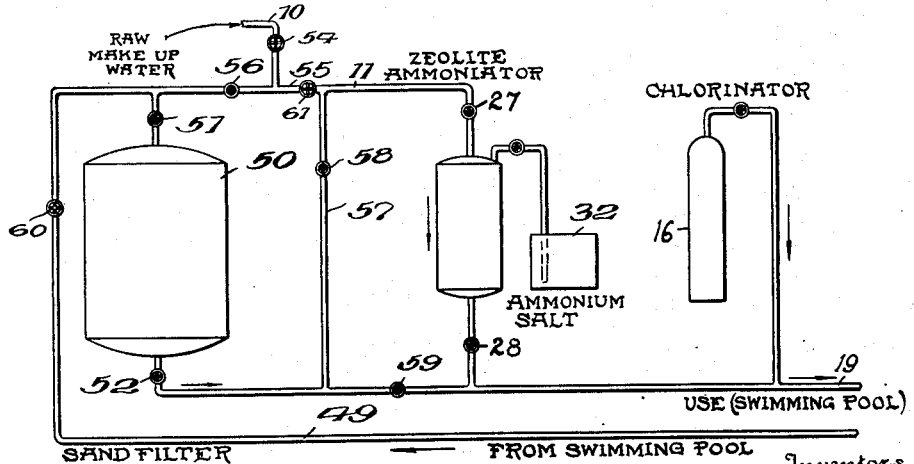

2,112,476

UNITED STATES PATENT OFFICE 2,112,476

STERILIZING WATER BY CHLORAMINES

Herbert L. Bowers and Ray Riley, Long Island City, N. Y., assignors to The Permutit Company, New York, N. Y., a corporation of Delaware Application November 2, 1935, Serial No. 48,041

6 Claims. (Cl. 210—28)

This invention relates to sterilizing water by chloramines; and it comprises an improvement in sterilizing water by the conjoint action of minute amounts of chlorin and of ammonia wherein a fraction of the water to be chlorinated is passed into contact with zeolites containing exchangeable ammonia, the zeolites being regenerated from time to time and the proportion of water so treated corresponding to the need for ammonia in sterilization, and the rest of the water is bypassed around the ammoniating device, there usually also being softening means located either in the bypass or in series with the ammoniator and the bypass; and it further comprises as an improvement in water sterilizing equipments having means for introducing chlorin into a flowing stream of water, the assemblage therewith of apparatus of the softener type but containing ammonium zeolites and mounted in parallel to the flowing stream with connections bypassing a portion of the flow therethrough and back to the main stream, said apparatus being provided with means for occasional regeneration by a solution of an ammonium salt; all as more fully hereinafter set forth and as claimed.

In sterilizing water, it is common to use chlorin and, in fact, most city water supplies are so sterilized. The amount of chlorin required to secure effective sterilization varies, of course, with the particular water, but it is always minute. As a rule, enough is used to give a residual excess of about one part of free or available chlorin per million. This gives a margin of safety and prevents chance of reinfection.

It is known that the quantity of chlorin can be considerably lessened and a more effective sterilization produced by a treatment with chlorin in the presence of a little ammonia. This is called chloramine sterilization; the chlorin and the ammonia react to furnish various chloramines of high sterilizing power. One of the great advantages of chloramine sterilization is that residual excess of chlorin in the form of chloramine is more stable and is available for a longer period following the sterilization than is a corresponding excess of free chlorin. The possibility of recontamination and reinfection is much less after a chloramine sterilization.

In plants utilizing chloramine sterilization, the chlorin is supplied to a flowing stream of water from a tank of liquefied gas, various expedients being used to secure uniform distribution of the minute amount of chlorin necessary for sterilization in the large body of water. It is quite difficult to avoid local excesses and deficiencies. Ammonia is usually supplied in the same way: from a tank of the liquefied gas, means being also provided to ensure uniform distribution of the ammonia in the water containing the chlorin. There are still greater difficulties in this even distribution of ammonia and particularly so since the amount to be added is rarely greater than one part per million; one milligram per liter. Ammoniators of ordinary types, especially for small scale installations, are costly and require skill in operation. One expedient which has been used in an effort to secure even distribution of ammonia is to allow a considerable period of time to elapse, after addition of the ammonia, prior to chlorination. While this results in a more uniform mingling of the ammonia and the water, it makes the process cumbersome and necessitates storage tanks.

Chloramine sterilization is used on the large scale in municipal water softening, but there are sterilizing installations on a less scale in which chloramine would be used but for the recited difficulties with ammoniators. For example, chlorin is largely used in sterilizing and maintaining sterile the water of swimming pools. A cyclic flow of water is established from and back to the pool, the flow passing through a filter and a chlorinating device. Chloramine sterilization of swimming pool water has been a desideratum, but the difficulties in providing satisfactory small scale ammoniators have been insurmountable.

We have found that the difficulties with regard to even distribution of minute amounts of ammonia in the water can be largely overcome and convenient apparatus made possible by the expedient of passing a portion of water to be sterilized in contact with granular zeolites containing exchangeable ammonia and regenerated from time to time by the use of ammonium salts. The proportion of the water so treated corresponds to the need for ammonia in the chlorination of the whole body. The treated body is reunited with the main body prior to chlorination and even admixture is not difficult. The ammoniated zeolites also have a softening action on the water, but since they are used only with a portion of the water, it is often necessary to use other water-softening means either in the bypassed flow or in series with the ammoniator and the bypass. The effective surface area of the body of ammoniated zeolite granules is very large, providing rapid and uniform addition of ammonia in the necessary minute amounts to the flow of water passing through the body. The effluent stream of water contains ammonia distributed therethrough uniformly and homogeneously.

Water is softened either by lime-soda installations or by contact with zeolites containing exchangeable sodium and regenerated from time to time with a solution of common salt. In the art, the term zeolite is used for any granular material which can be used in this way and the term is so used hereinafter. These zeolites, or granular base exchange materials, are sometimes purified natural materials, like glauconite, and sometimes artificial materials, such as dried and hardened aluminosilicate gels. Sometimes, preparations are made from clay, lignite, etc. All these materials contain exchangeable sodium which can be exchanged for calcium and magnesium of hard water. The sodium goes into solution as carbonate or bicarbonate. In the usual routine, regeneration is by a solution of sodium chlorid, whereupon the reverse exchange takes place, sodium going into the zeolite and calcium and magnesium into solution as chlorids. The use of sodium chlorid solution is invariable. So far as regeneration of exhausted zeolites is concerned, it can be effected by ammonium chlorid or ammonium sulfate, but their use is impracticable in ordinary water softening, for the reason that with the ordinary amount of hardness, the water would be left charged with a sufficient amount of ammonium carbonate to give it taste and odor.

But this objection to regeneration with ammonium salts does not apply in the present invention, since the amount of ammonia added to the water is merely about that required to react with the chlorin.

In the use of the present invention in sterilizing water, where the water, as is usually the case, is also to be softened, it is advantageous to install a pair of softening devices in parallel in the flow of water going to the chlorinating zone, one being an ordinary type of zeolite softener with connections for regenerating with common salt solution and the other also containing zeolites, but being provided with means for regenerating with a solution of ammonium salts. The major flow of water goes through the former softener and the minor through the latter, the relative proportions being adjusted to the need for ammonia in the chlorinating zone. Complete softening of the water supply is effected. However, since sodium in the water will exchange for ammonia, it is sometimes convenient to install an ordinary softener operating on the whole flow and divert a suitable fraction of the softened water through the ammoniator. Sometimes, a soda-lime softener is mounted ahead of and in series with the ammoniator and the bypass.

In sterilizing swimming pool water, the additional softener may treat the make-up water and in this event, part of the cyclic circulation from the pool through a filter and chlorinator, back to the pool, may be diverted through a zeolite ammoniator, the rest of the flow being bypassed. The ammoniator should be between the filter and chlorinator. In this use, the softening function of the ammoniator becomes important to take care of accumulation of hardness in the pool water, since it steadily abstracts hardness from the circulating water.

The proportion of water sent through the ammoniator to that bypassed depends somewhat on the quality and quantity of the saline constituents of the water. The present method is effective with any water containing the usual small proportions of salines. The saline content may be entirely Ca and Mg salts (hard water) or may be Na salts (softened water). Base exchange, with introduction of ammonia into the water, takes place equally effectively; and the regeneration procedure for the spent ammonium zeolites is the same. With water of ordinary hardness, the proportion of the total flow contacted with the ammonia zeolites is about 1 per cent.

The equipment required under the present invention is simple, the ammoniator being one of the standard types of softeners. It may be hand operated, single valved or automatic and is charged with any of the commercial zeolites. Glauconite and the synthetic zeolites are both desirable base exchanging bodies for the present purposes. There have recently been developed base exchange materials of a carbonaceous nature; among them prepared lignites. These materials are particularly suitable for the present invention. Whatever the material used, regeneration is effected from time to time using solutions of ammonium sulfate or ammonium chlorid in quite the same way that regeneration is effected in standard softeners using sodium chlorid. We find the carbonaceous materials mentioned lend themselves particularly well to regeneration with ammonium salts.

Where the whole flow of water is to be softened, two different sized commercial softeners may be mounted in parallel, one operating with salt regeneration and the other with ammonium chlorid regeneration. The soda softener should be the larger. It is, of course, possible to operate with a single softener unit, using alternate regeneration with salt and with ammonium chlorid; or a mixed regeneration with a solution containing both salts. This complicates operations somewhat but simplifies the apparatus installation. The ammonia content of the water can be somewhat more precisely controlled by using a separate zeolite ammoniator and so ordinarily we use a separate ammoniator.

With a typical raw water carrying hardness, calculated as calcium carbonate, of 150 parts per million and requiring the ordinary amount of chlorin for sterilization, the proportion sent through the side circuit, including the ammoniator, is mostly around 1 per cent of the total volume; the amount of ammonia added in this case being about 0.5 part of $NH_3$ per million of the total water.

An incidental advantage of the present invention is that it cheapens the cost of $NH_3$ in chloramine sterilization, a unit of $NH_3$ being cheaper in ammonium chlorid and ammonium sulfate than in liquid ammonia. The bother of working with liquefied gas is also obviated.

In the accompanying drawing, we have shown diagrammatically three examples of specific embodiments of the invention. In the showings, Fig. 1 is a diagram of a zeolite ammoniator and chlorinator combination;

Fig. 2 is a diagram of a combined zeolite ammoniator, sodium zeolite softener in parallel therewith and chlorinator; and Fig. 3 is a diagram of a filter, zeolite ammoniator and chlorinator arranged for treating a recycled flow from a swimming pool.

In the showings, in which like reference characters indicate like parts, Fig. 1 shows the simplest form of installation, useful where water is to be sterilized only and not softened. Raw water enters through a conduit 10. A portion is passed through a branch conduit 11 into a zeolite ammoniator 12, wherein bases in the water are replaced by corresponding ammonium compounds. The ammoniated water issues through a conduit 13 into an outlet conduit 14. Most of the raw water flow is bypassed directly to conduit 14, through a bypass conduit 29 (described post). Chlorin is supplied to the ammoniated water in conduit 14, as at the point 15, by means of a chlorinator comprising a receptacle for liquefied gaseous chlorin 16, an outlet pipe 17, and a control valve 18, regulated automatically in one of the ordinary ways to supply a controlled ratio of chlorin to the water. Chloramines are formed in the water and exert their sterilizing action. Water passes through a service conduit 19 to a point of use, not shown.

The chlorination is shown as taking place immediately after ammoniation. There is no need to delay chlorination after ammoniation, because the raw water in simply passing through the body of ammoniated zeolites is uniformly and homogeneously impregnated with the required trace of ammonia.

The zeolite ammoniator utilizes an ordinary softener 25 adapted for either upflow or downflow and charged with zeolites 26 shown as constituting a pervious bed. The softener has control valves 27 and 28 at the top and bottom. A bypass 29 is provided in parallel with the softener and having a control valve 30. By suitable manipulation of valves 27 and 28, or 30, any desired proportion of the raw water can be diverted as a side circuit through the ammoniator until the exchange capacity of the zeolites is substantially exhausted. When the water undergoing treatment is hard, the degree of exhaustion can be determined at any time by the well known soap test. Base exchange may be carried somewhat beyond limits feasible in ordinary soda base exchange softening.

Tank 32 is provided for supplying regenerating liquid; a solution of an ammonium salt, such as ammonium chlorid or ammonium sulfate. Regenerating liquid is delivered to the bed by means of conduit 33 controlled by valve 34. Rinsing and backwashing connections are not shown.

In the various embodiments illustrated, the ammoniator is located in a side or parallel circuit, the bulk of the water being bypassed. In doing this, many variations are possible. A lime-soda softener may be in series with the parallel ammoniator and bypass; or a lime-soda softener and a zeolite softener may be similarly in series with the two; or a zeolite softener and ammoniator in parallel may be connected in series with the lime-soda softener.

Referring to the drawing, the effluent from the softener is delivered to the apparatus of Fig. 1 through conduit 10. However, it is usually more convenient to mount the ammoniator-chlorinator combination in parallel with the lime-soda softener rather than in series therewith. Parallel installations are described in connection with Fig. 2.

Fig. 2 illustrates apparatus disposed in parallel; the ammoniator and chlorinator are like those in Fig. 1 and a sodium zeolite softener 40 of ordinary type is shown connected in parallel with the ammoniator. Connection is made to conduits 10 and 14 by conduits 41 and 42 controlled by valves 43 and 44. Valves 43 and 44 can be adjusted in correlation with valves 27 and 28 to divert the required portion of water through the ammoniator. The zeolite softener is arranged for regeneration in the ordinary manner, a brine tank 45 being provided with a conduit 46 and valve 47. Ordinarily, the ammoniator tank and equipment will be much smaller.

Fig. 3 shows an apparatus organization especially useful for swimming pool installations. In swimming pools, it is, as stated, desired to recycle the water continuously and filter and sterilize it, adding make-up water as required. In the apparatus of Fig. 3, water for the pool passes through an ammoniator-chlorinator combination as in Fig. 1, to the pool (not shown). Polluted water from the pool returns through a conduit 49 and filter 50, usually a sand filter, having valved inlet 51 and valved outlet 52, and mounted in series with the ammoniator-chlorinator. Most of the recycled water passes directly through the filter and on to the chlorinator, bypassing the ammoniator, a fraction being diverted through the ammoniator. The valved filter inlet (51) is connected to the zeolite ammoniator inlet conduit (11) by a cross connection 55, valved as at 56 and 61. The raw water inlet conduit (10) valved at 54 delivers into connection 55 between valves 56 and 61. A bypass 57, valved at 58, connects conduits 11 and 19 as shown. Thus raw make-up water can be passed directly into the zeolite ammoniator and chlorinator system, by closing valve 56 and opening valve 61, or it can be passed first through the filter and then through the sterilizer system, by opening valves 56, 51, 52 and 58, and closing valve 61.

The proportion of water diverted through the ammoniator is determined by the setting of valves 27 and 28 and a valve 59 located in conduit 19, as shown.

A valve 60 is provided in the return line (49) from the swimming pool, whereby this line can be shut off during introduction of make-up water if desired.

The ammoniator apparatus described is much cheaper than apparatus for feeding ammonia gas into water. It is simple to operate, since base exchange softener apparatus has been brought to a high degree of simplicity and foolproofness. The danger and inconvenience of the use of ammonia gas under high pressure are avoided.

What we claim is:—

1. A process for sterilizing water by the conjoint action of chlorin and ammonia, which comprises passing a portion of the water to be sterilized in contact with a granular body of zeolites containing exchangeable ammonia, whereby the portion of water passing in contact with the zeolites is uniformly supplied with ammonia, diverting the remainder of the water out of contact with the zeolites, reuniting said portion, after its passage through the zeolites, with the remainder of the water, and supplying chlorin to the water subsequent to its contact with the ammonia zeolites.

2. In softening water and sterilizing the softened water by the conjoint action of chlorin and ammonia, the process which comprises passing a major flow of the water in contact with zeolites containing exchangeable sodium and a minor flow in contact with zeolites containing exchangeable ammonia, reuniting the flows and treating the reunited flow of water with chlorin.

3. Apparatus for sterilizing water comprising a container, a body of ammoniated zeolites in the container, an inlet conduit for raw water, an outlet conduit for ammoniated water, means for feeding chlorin into the ammoniated water, valve means in one of said conduits for controlling flows through the container, and a valved bypass across the inlet and outlet of the container whereby any desired proportion of the raw water can be diverted through the container.

4. Apparatus for sterilizing and softening water comprising a container, a body of ammoniated zeolites in the container, a valved inlet conduit for raw water, an outlet conduit for ammoniated water, means for feeding chlorin into the ammoniated water, a water softener and valved conduits connecting it in parallel with the container for ammoniated zeolites.

5. Apparatus for clarifying and sterilizing water comprising an inlet conduit for dirty water, a filter in valved communication therewith and delivering filtered water, a container holding a body of ammoniated zeolites, valved conduit means for diverting a fraction of the filtered water flow through the container, means for reuniting said diverted fraction with the undiverted fraction, and means for introducing chlorin into the filtered water after leaving the zeolite container.

6. A method of purifying the water of swimming pools by the action of chloramines, said water containing bases capable of base exchange, comprising withdrawing a flow of contaminated water from the pool, filtering the water, passing a portion of the water flow through a body of ammoniated zeolites, diverting the remainder of the water out of contact with the zeolites, reuniting said portion with the undiverted flow, supplying chlorin to the reunited flow, returning the reunited flow to the pool and regenerating the zeolites from time to time with a solution of an ammonium compound.

HERBERT L. BOWERS.
RAY RILEY.